United States Patent
Saito et al.

(10) Patent No.: US 10,396,890 B2
(45) Date of Patent: Aug. 27, 2019

(54) INFORMATION PROCESSING APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventors: Masaaki Saito, Kawasaki (JP); Junichiro Ono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/049,944

(22) Filed: Jul. 31, 2018

(65) Prior Publication Data
US 2019/0044615 A1 Feb. 7, 2019

(30) Foreign Application Priority Data
Aug. 3, 2017 (JP) .................................. 2017-150328

(51) Int. Cl.
*H04B 10/03* (2013.01)
*G06F 9/455* (2018.01)
(Continued)

(52) U.S. Cl.
CPC ............. *H04B 10/03* (2013.01); *G06F 9/455* (2013.01); *H04B 10/27* (2013.01); *H04L 12/4641* (2013.01); *H04L 45/586* (2013.01)

(58) Field of Classification Search
CPC ........... G06F 2009/45595; H04L 49/70; H04L 12/4641; H04L 2012/5617;
(Continued)

(56) References Cited

U.S. PATENT DOCUMENTS

| 6,587,467 | B1 * | 7/2003 | Morgenstern ....... H04L 12/1836 370/399 |
| 7,672,319 | B1 * | 3/2010 | Heath ................. H04L 12/4625 370/401 |

(Continued)

FOREIGN PATENT DOCUMENTS

| JP | 2007-325160 A | 12/2007 |
| JP | 2008-227985 A | 9/2008 |

OTHER PUBLICATIONS

Larry Peterson, "CORD", [online] Cord Wiki Home: Internet<URL:https://wiki.opencord.org/display/CORD>, Jun. 26, 2017(Total 1 page).
(Continued)

*Primary Examiner* — Tanya T Motsinger
(74) *Attorney, Agent, or Firm* — Fujitsu Patent Center

(57) ABSTRACT

An information processing apparatus includes a memory, and a processor coupled to the memory and configured to obtain function information indicating a hardware function of a first station-side device on a physical network and communication state information indicating a communication state of the first station-side device, based on the function information, generate setting information for switching a first communication between the first station-side device and a terminal device to a second communication between a second station-side device on a virtual network and the terminal device, specify, based on the communication state information, a time period in which the first communication is not executed, specify switching time which is in the identified time period and at which the first communication is to be switched to the second communication, and cause, based on the setting information and the specified switching time, the second station-side device to start the second communication.

18 Claims, 10 Drawing Sheets

(51) Int. Cl.
*H04B 10/27* (2013.01)
*H04L 12/46* (2006.01)
*H04L 12/713* (2013.01)

(58) Field of Classification Search
CPC . H04L 2012/5632; H04L 43/08; H04L 45/00; H04Q 11/0005; H04Q 11/0067
See application file for complete search history.

(56) References Cited

U.S. PATENT DOCUMENTS

| | | | | | |
|---|---|---|---|---|---|
| 8,027,354 | B1* | 9/2011 | Portolani | | H04L 49/70 370/395.2 |
| 10,164,827 | B2* | 12/2018 | Furukawa | | H04L 41/0813 |
| 2008/0226293 | A1 | 9/2008 | Ogushi | | |
| 2008/0262990 | A1* | 10/2008 | Kapoor | | G06F 9/505 706/20 |
| 2010/0274890 | A1* | 10/2010 | Patel | | G06F 9/4862 709/224 |
| 2011/0231564 | A1* | 9/2011 | Korsunsky | | G06F 21/55 709/231 |
| 2011/0283017 | A1* | 11/2011 | Alkhatib | | H04L 12/4641 709/244 |
| 2014/0129700 | A1* | 5/2014 | Mehta | | H04L 43/0817 709/224 |
| 2014/0219654 | A1* | 8/2014 | Mitsui | | H04Q 11/0067 398/45 |
| 2015/0026681 | A1* | 1/2015 | Lin | | G06F 9/45533 718/1 |
| 2015/0363221 | A1* | 12/2015 | Terayama | | H04L 12/4641 718/1 |
| 2017/0026469 | A1* | 1/2017 | Usgaonkar | | H04L 67/1097 |
| 2018/0095915 | A1* | 4/2018 | Prabhakar | | G06F 9/455 |
| 2018/0262599 | A1* | 9/2018 | Firestone | | H04L 49/70 |
| 2019/0036783 | A1* | 1/2019 | Xu | | H04L 41/0806 |
| 2019/0036868 | A1* | 1/2019 | Chandrashekhar | ... | H04L 61/103 |

OTHER PUBLICATIONS

Larry Peterson, "Residential CORD", [online] Internet<URL:https://wiki.opencord.org/display/CORD/Residential+CORD>, Jun. 26, 2017(Total 1 page).

Tom Anschutz, "An Introduction to Residential CORD(R-CORD)", At&T, Jul. 29, 2016, [online] Internet<URL: https://wiki.opencord.org/download/attachments/1278537/Tom%20Anschutz%20R-CORD%20Intro.pdf?version=1&modificationDate=1470095130747&api=v2>, Jun. 26, 2017(Total 16 pages).

Yoshihiko Kanaumi, "What is ONOS(Open Network Operating System)" NEC, [online] Internet<URL:http://www.sdnjapan.org/archive/2015/2015pdf/1404_kanaumi.pdf>, Jun. 23, 2017(Total 32 pages).

NEC, "NEC SDN Solutions", Feb 16, 2015, retrieved from: http://jpn.nec.com/sdn/pdf/catalog_sdn.pdf, with partial English translation.

* cited by examiner

FIG. 5

HARDWARE FUNCTION INFORMATION (A) + SETTING PARAMETER INFORMATION (B)

| OLT #1 | MAINTENANCE FUNCTION | ONU AUTHENTICATION FUNCTION | BRIDGE FUNCTION | ENCRYPTION AUTHENTICATION FUNCTION | XXX FUNCTION |
|---|---|---|---|---|---|
| FUNCTION | ✓ | ✓ | ✓ | ✓ | — |
| SETTING PARAMETER 1 | aaa | bbb | ccc | ddd | — |
| SETTING PARAMETER 2 | eee | fff | ggg | hhh | — |
| : | : | : | : | : | : |

A = {FUNCTION}, B = {SETTING PARAMETER 1, SETTING PARAMETER 2}

COMMUNICATION STATE

| OLT #1 PON Port | ONU | LLID | OLT⇔ONU COMMUNICATION START TIME | | | OLT⇔ONU COMMUNICATION END TIME | | | OLT⇔ONU NON-COMMUNICATION TIME | | | OLT⇔ONU NON-COMMUNICATION TIME SLOT (/Port) |
|---|---|---|---|---|---|---|---|---|---|---|---|---|
| Port #1 | #1 | #1 | X1 | X1' | X1" | Y1 | Y1' | Y1" | X1'-Y1 | X1'-Y1' | : | X~Y |
|  | #2 | #2 | X2 | X2' | X2" | Y2 | Y2' | Y2" | X2'-Y2 | X2'-Y2' | : | X~Y |
|  | : | : | : | : | : | : | : | : | : | : | : | : |
|  | #n | #n | Xn | Xn' | Xn" | Yn | Yn' | Yn" | Xn'-Yn | Xn'-Yn' | : | X~Y |
|  | : | : | : | : | : | : | : | : | : | : | : | : |
| Port #2 | : | : | : | : | : | : | : | : | : | : | : | : |
| Port #N | : | : | : | : | : | : | : | : | : | : | : | : |

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-150328, filed on Aug. 3, 2017, the entire contents of which are incorporated herein by reference.

FIELD

The embodiments discussed herein are related to an information processing apparatus, a method and a non-transitory computer-readable storage medium.

BACKGROUND

In recent years, techniques for virtualizing a network are being proposed and constructed using Network Function Virtualization (NFV), Software Defined Networking (SDN), or the like for the purpose of increasing flexibility in operation, speeding up of service provision, and reducing in facility investment and operation cost. Related-art technical documents include "CORD", Larry Peterson, "Residential CORD", Tom Anschutz, "An Introduction to Residential CORD (R-CORD)", "NEC SDN Solutions", Yoshihiko KANAUMI, "What is ONOS (Open Network Operating System)".

SUMMARY

According to an aspect of the invention, an information processing apparatus includes a memory, and a processor coupled to the memory and configured to obtain function information indicating a hardware function of a first station-side device on a physical network and communication state information indicating a communication state of the first station-side device, based on the function information, generate setting information for switching a first communication between the first station-side device and a terminal device to a second communication between a second station-side device on a virtual network and the terminal device, specify, based on the communication state information, a time period in which the first communication is not executed, specify switching time which is in the identified time period and at which the first communication is to be switched to the second communication, and cause, based on the setting information and the specified switching time, the second station-side device to start the second communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating individual examples of hardware function information, setting parameter information, and communication state.

DESCRIPTION OF EMBODIMENTS

When operation is switched from an existing physical network (also described as an existing network) to a virtualized virtual network (also described as a virtual network), the existing network is sometimes disconnected temporarily in order to avoid residual data, data collision, the occurrence of an alarm, or the like. That is, when operation on an existing network is stopped due to switching from the existing network to a virtual network, if there is data being transmitted between a station-side termination device and a subscriber-side termination device in the existing network, a situation where the data is discarded might occur. Accordingly, during a period from stopping operation of the existing network to starting operation of the virtual network, users sometimes become unable to receive communication services.

In the present embodiment, a description will be given of the Internet for home use (FTTH: Fiber To The Home) as an example. However, the present disclosure is not limited to this case, and it is possible to apply the present disclosure to any method, FTx (FTTx: Fiber To The x), such as FTTN (FTTN: Fiber To The Node), or the like.

Figure 1:
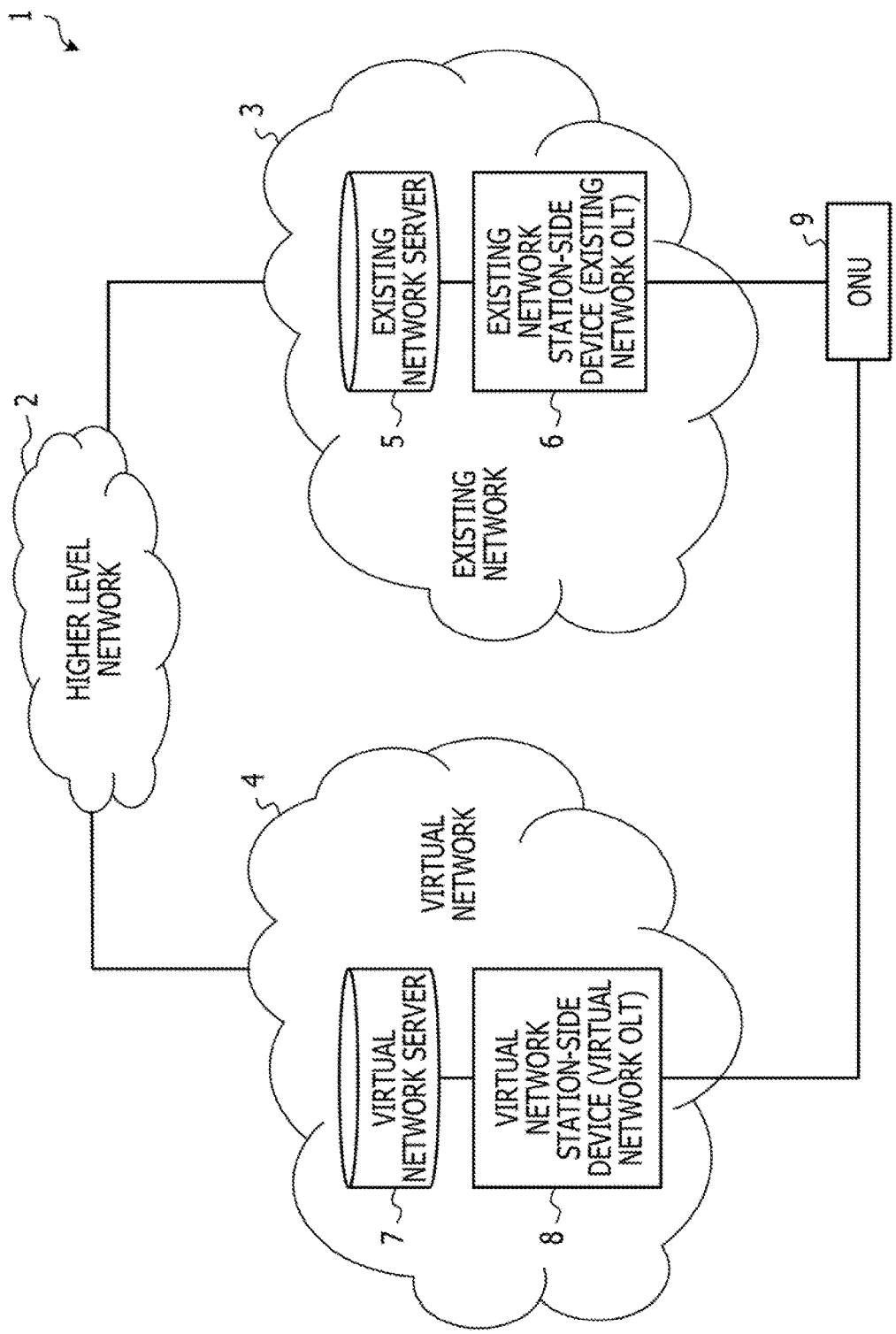
FIG. 1 is a diagram illustrating an example of the configuration of a communication control system according to the present embodiment.

FIG. 1 is a diagram illustrating an example of the configuration of a communication control system 1 according to the present embodiment. The communication control system 1 according to the present embodiment includes an existing network 3 and a virtual network 4 that are coupled with each other via a higher level network 2. The higher level network is, for example, the Internet, an intranet, or the like.

The existing network 3 is a network, such as an intranet, or the like in which data communication is performed using the related-art method. On the other hand, the virtual network 4 is a network, such as an intranet, or the like in which data communication is performed using virtualization technology. In this regard, in the following description, a station-side termination device in each network is sometimes referred to as a station-side device.

The station-side device (also described as an existing network station-side device) in the existing network 3 realizes its function by hardware. On the other hand, the processing of the station-side device (also described as a virtual network station-side device) in the virtual network 4 is realized by software that provides the same function as the function provided by hardware of the existing network station-side device. The software is generated by a virtual network server 7 described later. Hereinafter the software is also described as virtualization software. Also, in the present embodiment, it is assumed that a station-side device is an Optical Line Terminal (OLT).

Referring to FIG. 1, the existing network 3 includes one or more servers (existing network servers 5) and existing network OLTs (existing network OLTs 6) that are coupled to these respectively. Also, the virtual network 4 includes one or more servers (virtual network servers 7) and virtual network OLTs (virtual network OLTs 8) that are coupled to these respectively. In this regard, the existing network server is also described as an existing network communication control device, and the virtual network server is also described as a virtual network communication control device or a communication control device.

The existing network server 5 holds information (also described as hardware functional information) regarding one or more functions of each coupled existing network OLT 6 and information (also described as setting parameter information) on the respective setting parameters for the one or more functions, and information concerning the communication state of the existing network OLT 6. The detailed description will be given later of these pieces of information.

The virtual network server 7 obtains the hardware function information, the setting parameter information, and the information concerning the communication state from the existing network server 5 via the higher level network 2. The virtual network server 7 generates virtualization software from the obtained hardware function information. Also, the virtual network server 7 performs conversion, update, and the like of the setting parameter of each virtual network OLT 8 under the control thereof using the setting parameter information. The conversion, the update, and the like of the setting parameter are performed on the virtualization software here. The setting parameter that has been updated, or the like on the virtualization software is also described as setting information. Further, the virtual network server 7 also determines time (also described as switching time) at which processing is switched from the communication processing in the existing network 3 to the communication processing in the virtual network 4 based on the information concerning the communication state.

The existing network OLT 6 is an existing OLT, and thus the description thereof will be omitted.

The virtual network OLT 8 starts communication processing with a subscriber-side device (ONU 9) described below from the above-described switching time based on the setting information generated by the virtual network server 7.

The existing network OLT 6 and the virtual network OLT 8 are individually coupled to the subscriber-side device. In the present embodiment, it is assumed that the subscriber-side device is an Optical Network Unit (ONU) 9. The ONU 9 is an existing device, and thus the description thereof will be omitted.

Figure 2:
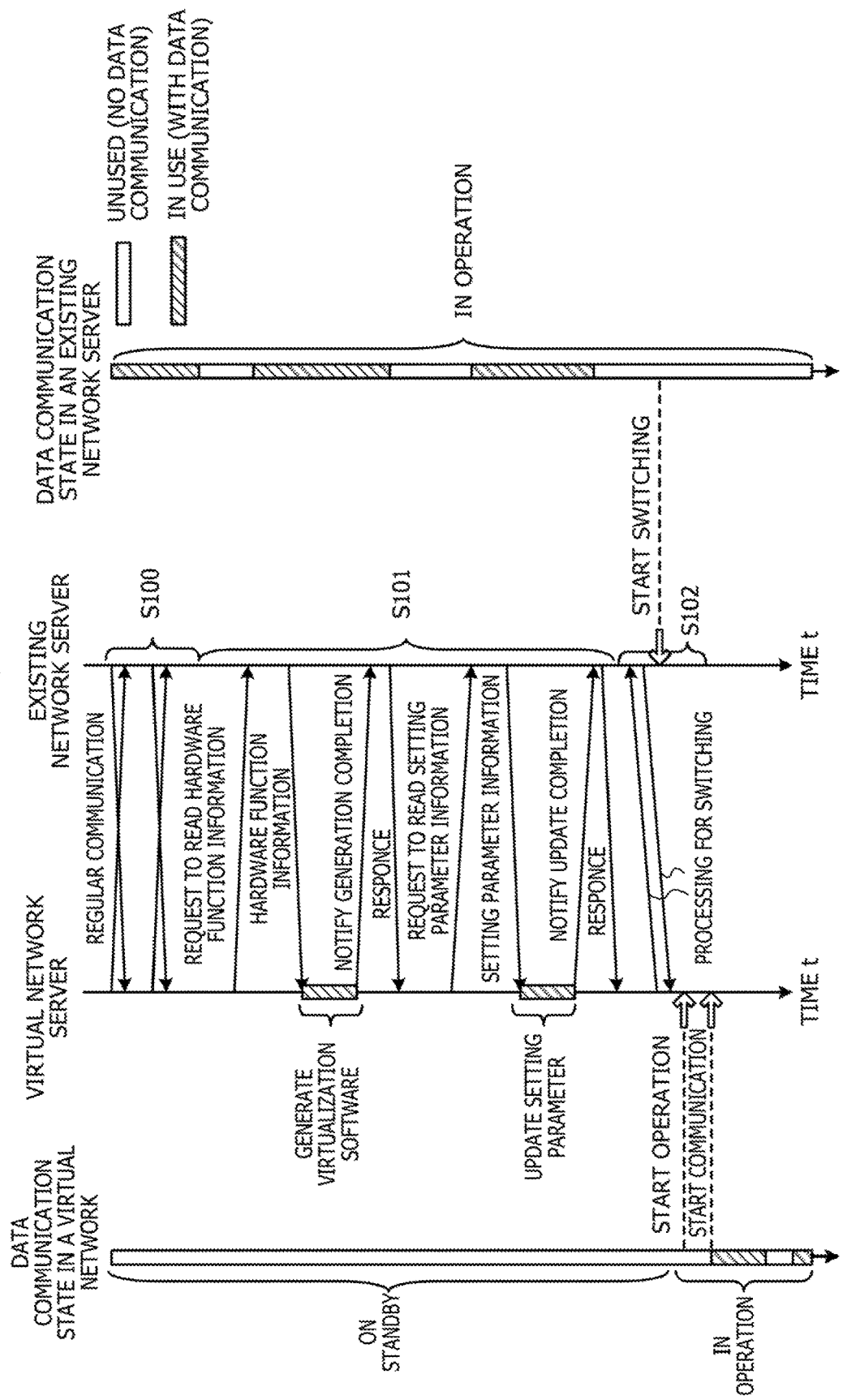
FIG. 2 is a diagram illustrating an example of the sequence of the communication control system according to the present embodiment.

FIG. 2 is a diagram illustrating an example of the switching sequence of the operation from the existing network 3 to the virtual network 4 in the communication control system 1 according to the present embodiment. A detailed description will be given later of each processing from step S100 to step S102 described below.

In this regard, it is assumed that time synchronization processing has already been performed between the existing network server 5 and the virtual network server 7 prior to step S100. Also, in the stage of step S100, the existing network 3 is in an operating state, and data communication is possible.

In step S100, regular communication is performed between the existing network server 5 and the virtual network server 7. The regular communication in the present embodiment is started by the existing network server 5 receiving a signal transmitted regularly from the virtual network server 7. In this regard, the period of the regular communication is, for example, 3.3 milliseconds (ms), 10 ms, or the like that is defined by ITU-T Y.1731. However, the period is not limited to this.

In step S101, the virtual network server 7 transmits a read request of hardware function information to the existing network server 5. The existing network server 5 that has received this transmits the hardware function information to the virtual network server 7. The virtual network server 7 generates virtualization software based on the hardware function information received from the existing network server 5. When the generation is completed, the virtual network server 7 notifies the existing network server 5, which is the transmission source of the hardware function information, of the completion of the generation of the virtualization software. The existing network server 5 that has received this notification transmits a response to the virtual network server 7.

In the same manner, in step S101, the virtual network server 7 transmits a read request of setting parameter information to the existing network server 5, which has been the transmission source of the hardware function information. The existing network server 5 that has received this request transmits the setting parameter information to the virtual network server 7. The virtual network server 7 updates the setting parameter for setting the virtual network OLT 8 under the control thereof based on the setting parameter information received from the existing network server 5. When this update is completed, the virtual network server 7 notifies the existing network server 5 that is the transmission source of the setting parameter of the completion of the update of the setting parameter. The existing network server 5 that has received this notification transmits a response to the virtual network server 7.

Also, although not illustrated in the figure, in the present embodiment, in step S101, the virtual network server 7 notifies the virtual network OLT 8 under the control thereof of the setting information or causes the virtual network OLT 8 to read the setting information. In this regard, the processing may be performed at the time of switching described below.

In step S102, although not illustrated in the figure because a detailed description will be given later, prior to execution of switching to perform communication processing on the virtual network 4, the virtual network server 7 requests, from the existing network server 5, information concerning the communication state of the existing network OLT 6, which is the under the control of the existing network server 5. In response to this, the existing network server 5 notifies the virtual network server 7 of the communication state. The virtual network server 7 determines switching time from communication processing on the existing network 3 to communication processing on the virtual network 4 based on the obtained information concerning the communication state and notifies the existing network server 5 of this. The switching time is determined from time slots during which there is no data transmission between the existing network OLT 6 under the control of the existing network server 5, which has notified the communication state, and the ONU 9 coupled to this. In this regard, it is possible for the virtual network server 7 to specify a switching target for each existing network OLT 6, for each coupled port (also described as a port) of the existing network OLT 6, or for each ONU 9 coupled to the existing network OLT 6. Then, it is possible for the virtual network server 7 to determine switching time for each switching target.

The virtual network 4 migrates from a standby state of having no data communication to an operating state of receiving data communication at the switching time. Following this, data communication between the virtual network OLT 8 and the ONU 9 coupled to the OLT 8 is started.

In the existing network 3, switching is performed for each existing network OLT 6, coupled port, or ONU 9. Accordingly, even at the time subsequent to the switching time, at the existing network 3 side, entities other than the target of the switching may be in an operating state.

From this, in the present embodiment, without discarding data being transmitted in the existing network 3 and without disconnecting communication, it is possible to migrate from the processing on the existing network 3 to the processing on the virtual network 4.

Figure 3:
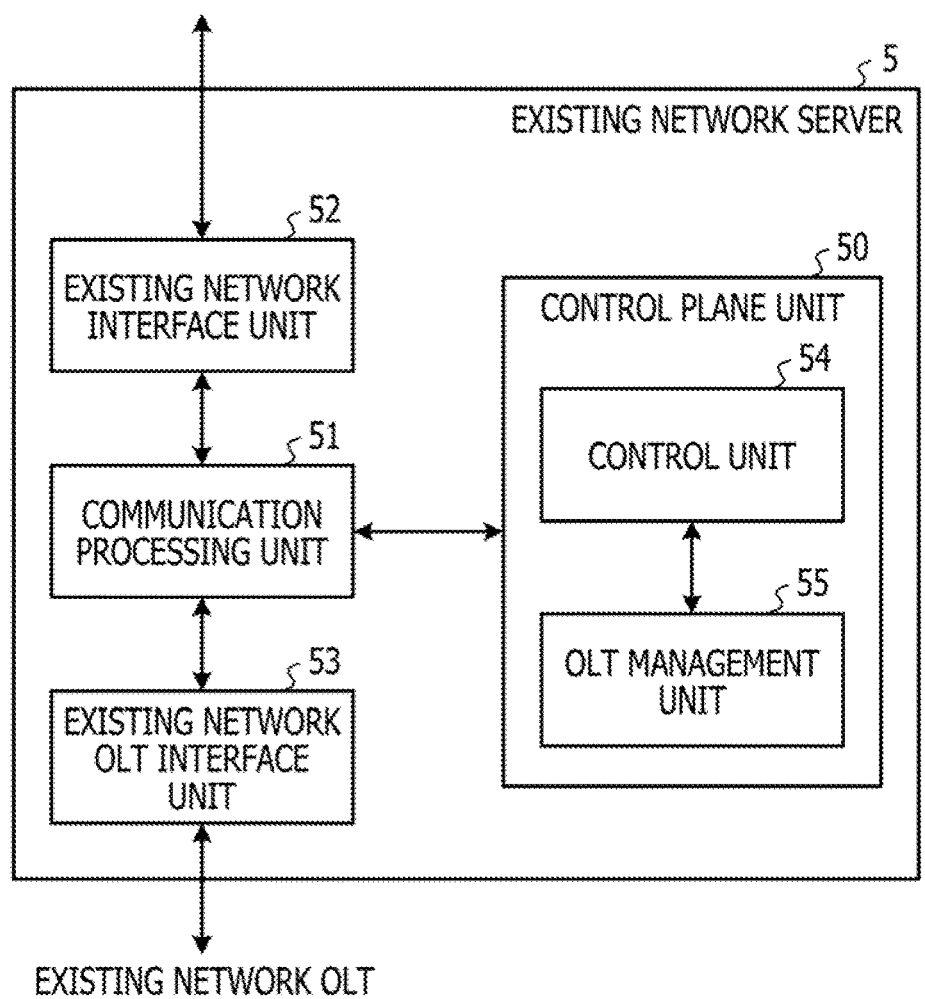
FIG. 3 is a diagram illustrating an example of the functional block of an existing network server.

FIG. 3 is a diagram illustrating an example of the functional block of the existing network server 5. The existing network server 5 includes a control plane unit 50, a communication processing unit 51, an existing network interface unit 52, and an existing network OLT interface unit 53, and the like. Also, the control plane unit 50 includes a control unit 54, an OLT management unit 55, and the like. The communication processing unit 51 is coupled to the control plane unit 50, the existing network interface unit 52, and the existing network OLT interface unit 53. The control unit 54 and the OLT management unit 55 are coupled with each other. However, there may be additional coupling relationships.

The communication processing unit 51 has a function of performing communication with the other servers, and the like in the existing network 3 via the existing network interface unit 52, and exchanging data with the virtual network server 7, and the like in the virtual network 4 via the higher level network 2. The communication processing unit 51 performs regular communication with the virtual network server 7 in accordance with an instruction from the control unit 54.

The communication processing unit 51 obtains various kinds of information from the existing network OLT 6 via the existing network OLT interface unit 53 and transmits various instructions, and the like to the existing network OLT.

The existing network interface unit 52 is an interface by which the existing network server 5 exchanges data with the other nodes via the existing network 3 and the higher level network 2.

The existing network OLT interface unit 53 is an interface by which the existing network server 5 exchanges information with the existing network OLT 6.

The control unit 54 controls each functional block of the existing network server 5. The OLT management unit 55 manages the existing network OLT 6. That is, the OLT management unit 55 holds the hardware function information, the setting parameter information, and the like of the existing network OLT 6 to be a management target. Also, the OLT management unit 55 outputs the hardware function information, the setting parameter information, and the like to the control unit 54 in response to a request from the control unit 54.

Figure 4:
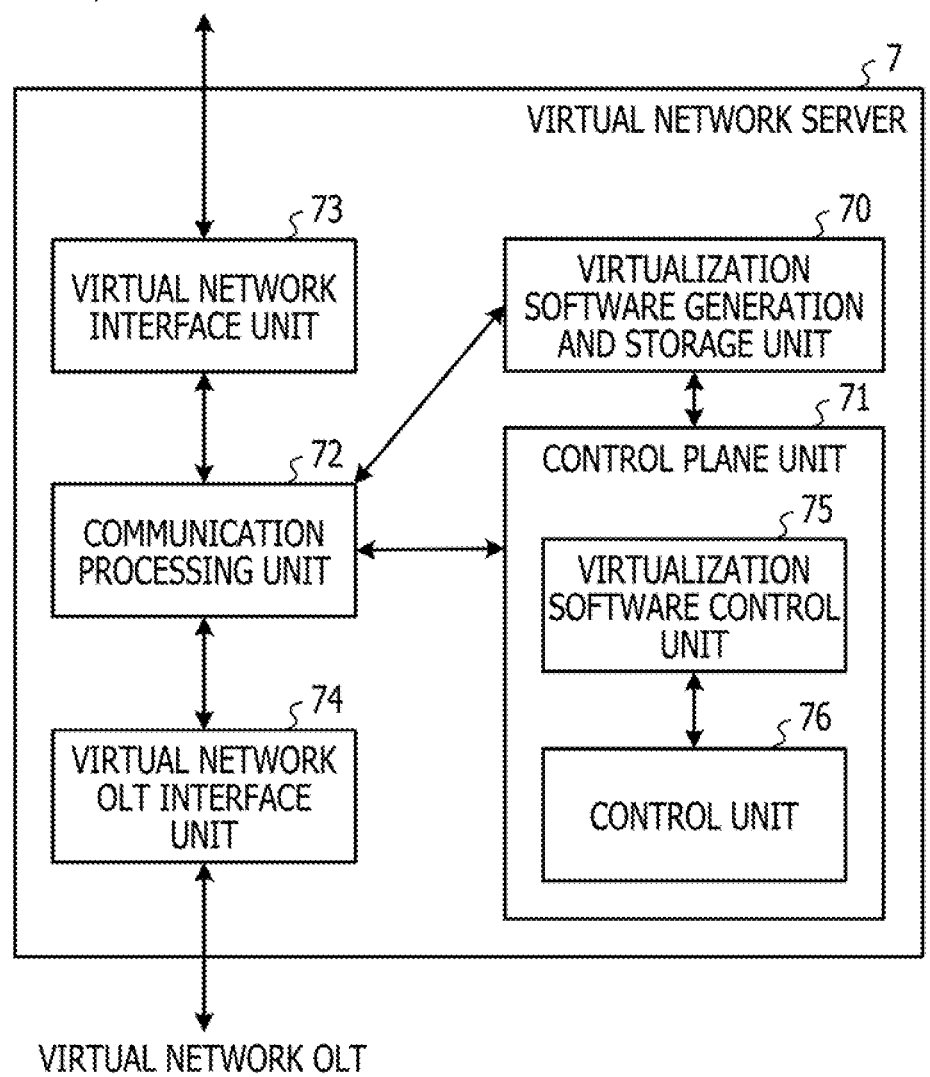
FIG. 4 is a functional block diagram of a virtual network server according to the present embodiment.

FIG. 4 is a functional block diagram of the virtual network server 7 according to the present embodiment. The virtual network server 7 includes a virtualization software generation and storage unit 70, a control plane unit 71, a communication processing unit 72, a virtual network interface unit 73, a virtual network OLT interface unit 74, and the like. Also, the control plane unit 71 includes a virtualization software control unit 75, a control unit 76, and the like. The communication processing unit 72 is coupled to the virtualization software generation and storage unit 70, the control plane unit 71, the virtual network interface unit 73, and the virtual network OLT interface unit 74. The virtualization software generation and storage unit 70 is coupled to the control plane unit 71. The virtualization software control unit 75 and the control unit 76 are coupled with each other. In this regard, there may be other coupling relationships.

The virtualization software generation and storage unit 70 obtains the hardware function information, the setting parameter information, and the communication state from the existing network server 5 via the virtual network interface unit 73 and the communication processing unit 72. The virtualization software generation and storage unit 70 generates virtualization software from the hardware function information based on an instruction from the virtualization software control unit 75. The virtualization software generation and storage unit 70 then updates the setting parameter of the virtual network OLT 8, or the like corresponding to the existing network OLT 6, or the like based on the setting parameter information and generates setting information. The virtualization software generation and storage unit 70 then transmits the generated setting information to the virtual network OLT 8 under the control thereof. In this regard, the transmission processing of the setting information may be performed to the virtual network OLT 8 of the switching target, the virtual network OLT 8 having a port to be a switching target, or the virtual network OLT 8 coupled to the ONU 9 to be a switching target after the switching target is determined.

The virtualization software generation and storage unit 70 determines a switching target and switching time from the communication state. The virtualization software generation and storage unit 70 then performs, at the switching time, migration processing to the virtual network OLT 8 corresponding to the switching target, the virtual network OLT 8 having a port corresponding to the switching target, or the communication processing using the virtual network OLT 8 coupled to the ONU 9 of the switching target.

The communication processing unit 72 includes a function of performing communication with the other servers, and the like in the virtual network 4 via the virtual network interface unit 73, and transmitting and receiving data with the existing network server 5, and the like in the existing network 3 via the higher level network 2. The communication processing unit 72 performs processing for carrying out the regular communication with the existing network server 5 in response to an instruction from the control unit 76.

The communication processing unit 72 also exchanges various kinds of information with the virtual network OLT 8 via the virtual network OLT interface unit 74. The communication processing unit 72 transmits the setting information generated by the virtualization software generation and storage unit 70 to the virtual network OLT 8 via the virtual network OLT interface unit 74.

The virtual network interface unit 73 is an interface for the virtual network server 7 to exchange information via the virtual network 4 and the higher level network 2. By the virtual network interface unit 73, it is possible for the virtual network server 7 to transmit and receive data with nodes, such as the other servers in the virtual network 4, and the like, the existing network server 5, and the like.

The virtual network OLT interface unit 74 is an interface for the virtual network server 7 to exchange information with the virtual network OLT 8.

The virtualization software control unit 75 controls the virtualization software generation and storage unit 70. The control unit 76 controls the communication processing unit 72 and the virtualization software control unit 75.

FIG. 5 illustrates individual examples of hardware function information, setting parameter information, and communication state. In this regard, the information indicating the hardware function information, the setting parameter information, and the communication state is held, for example, by the virtualization software generation and storage unit 70.

The existing network OLT 6 under the control of the existing network server 5 is given an identification number, and in FIG. 5, the hardware function information of the existing network OLT 6 having an identification number #1, and the like are illustrated. In this regard, hereinafter the identification number is expressed by #m (m: natural number), or the like, but the identification number may be expressed in any form as long as the existing network OLT 6 is uniquely identifiable. In the upper portion in FIG. 5, the hardware function information and the setting parameter information of the existing network OLT 6 having the identification number #1 are illustrated. Here, a part A corresponds to the hardware function information, and a part B corresponds to the setting parameter information. In FIG. 5, these pieces of information are illustrated in a tabular form, but the data is not limited to be expressed in a tabular form. For example, the hardware function information may be information for associating an identification number in the existing network OLT 6 with a function of the existing network OLT 6. Also, the setting parameter information may be information for associating an identification number in the existing network OLT 6 with a function of the existing network OLT 6 and a setting parameter value of the function.

Here, referring to combinations of the hardware function information and the setting parameter information in the upper portion in FIG. 5, one or more setting parameters are provided for one function. That is, each function changes the way of realization depending on a change of each value of the corresponding one or more setting parameters.

In the example in FIG. 5, check marks are given to a maintenance function, an ONU authentication function, a bridge function, and an encryption authentication function. That is, the existing network OLT 6 having the identification number #1 has these functions.

Here, the maintenance function is for detecting a failure in a network and handling this. The ONU authentication function is for the existing network OLT 6 to identify an ONU 9 under the control thereof. The bridge function is for operating the existing network OLT 6 as a bridge and enabling communication of Ethernet frames, and the like. The encryption authentication function is for authenticating whether or not the data related to the communication is from a contracted user and encrypting the data. In this regard, the functions held by the existing network OLT 6 are not limited to those described above. A XXX function is a function that the existing network OLT 6 is able to have in addition to the functions described above. In this regard, in FIG. 5, the column of the XXX function is indicated by "−". This indicates that the existing network OLT 6 having the identification number #1 has the maintenance function, the ONU authentication function, the bridge function, and the encryption authentication function, but does not have the other functions.

The setting parameter information exemplified in the B part in the upper portion in FIG. 5 is tied to the identification number and the function of the existing network OLT 6. Also, the setting parameter information includes individual values of one or more setting parameters in each function. In the setting parameter information in FIG. 5, there are setting parameters 1 and 2, and the setting parameters differ for each function. Here, one or more setting parameters for each function are given numbers, and the setting parameter information is indicated using these numbers. Here, referring to the value of the setting parameter 1 of the maintenance function in the setting parameter information, it is understood that the value is "aaa". In this regard, "aaa" indicates a numeric value, or the like, and "bbb", and the like are the same.

Next, a description will be given of the communication state illustrated in the lower portion in FIG. 5. Here, the communication states between the existing network OLT 6 having the identification number #1 and ONUs 9 coupled to this are illustrated. In this regard, the communication states here are illustrated in a tabular form in the same manner as the hardware function information described above, but the communication states are not limited to be expressed in this form. It is understood that the ONUs 9 having the identification numbers from #1 to #n (n: a natural number of 1 or more) are coupled to a port (Port #1) having the port number #1 in the existing network OLT 6 having the identification number #1. Also, unique Logical Link IDs (LLIDs) are assigned to the respective ONUs 9 having the identification numbers from #1 to #n by the existing network OLT 6. In this regard, in FIG. 5, the LIDs are assigned in the same manner as the identification numbers of the respective ONUs 9, but LLIDs are not limited to these.

Here, referring to the ONU 9 having the identification number #1 in the communication state in FIG. 5, in the column "OLT⇔ONU communication start time", X1, X1', X1", and the like are illustrated, and in the column "OLT⇔ONU communication end time", Y1, Y1', Y1", and the like are illustrated. In this regard, it is assumed here that time elapses in order of X1, Y1, X1', Y1', X1", and Y1". Here, the ONU 9 having the identification number #1 and the existing network OLT 6 having the identification number #1 started communication at X1, ended the communication at Y1, restarted communication at X1', ended the communication at Y1', also started communication again at X1", and ended the communication at Y". Thereby, it is understood that the non-communication time between the ONU 9 and the existing network OLT 6 becomes X1'-Y1 (a time period from Y1 to X1') and X1"-Y1' (a time period from Y1' to X1") as illustrated in the column "OLT⇔ONU non-communication time".

Similarly, in the communication state, in the column "OLT⇔ONU non-communication time slot (/Port)", a time slot during which communication is not performed between the existing network OLT 6 and one or more ONUs 9 coupled to each port thereof is illustrated. For example, the ONUs 9 coupled to the port having the port number #1 do not perform communication with the existing network OLT 6, which is the coupling destination, in a time slot from time X to time Y.

The virtual network server 7 refers to the communication state described above and determines switching time to perform switching operation from the existing network 3 to the virtual network 4. Specifically, the virtual network server 7 determines the switching time among the time slots (non-communication times) during which communication is not performed between the existing network OLT 6 in the existing network 3 and the ONUs 9. Accordingly, it is possible for the existing network server 5 and the virtual network server 7 to perform switching processing without disconnecting the user's communication.

Figure 6:
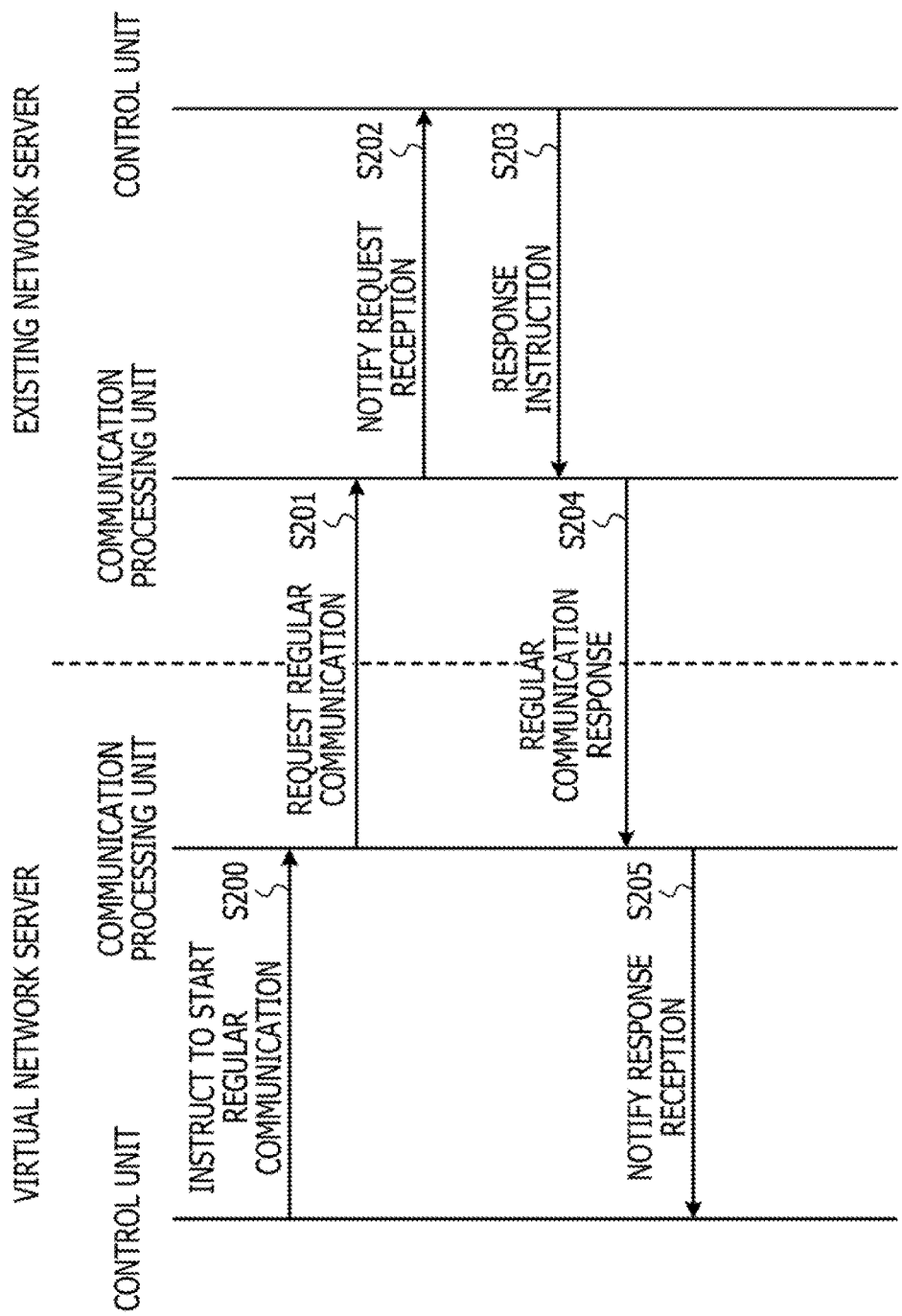
FIG. 6 is a diagram illustrating an example of the sequence of start processing of regular communication.

Next, a description will be given of the processing flow of each functional block of each of the virtual network server 7 and the existing network server 5 according to the present embodiment. FIG. 6 is a diagram illustrating an example of the sequence of start processing of regular communication, which has been briefly described in step S100 in FIG. 2.

The control unit 76 of the virtual network server 7 instructs the communication processing unit 72 to perform regular communication with the existing network server 5 (step S200). The communication processing unit 72 transmits information (also described as a regular communication request) that triggers starting regular communication to the existing network server 5 via the virtual network interface unit 73 (step S201). The communication processing unit 51 of the existing network server 5 receives the regular communication request from the virtual network server 7 via the existing network interface unit 52, and notifies the control unit 54 of reception of the request or outputs the request to the control unit 54 (step S202). The control unit 54 instructs the communication processing unit 51 to transmit a response (also described as a regular communication response) to the request (step S203). The communication processing unit 51 that has received the instruction transmits a regular communication response to the virtual network server 7 via the existing network interface unit 52 (step S204). The communication processing unit 72 of the virtual network server 7 receives a regular communication response from the existing network server 5 via the virtual network interface unit 73, and notifies the control unit 76 that the response has been received or outputs the response to the control unit 76 (step S205).

Figure 7:
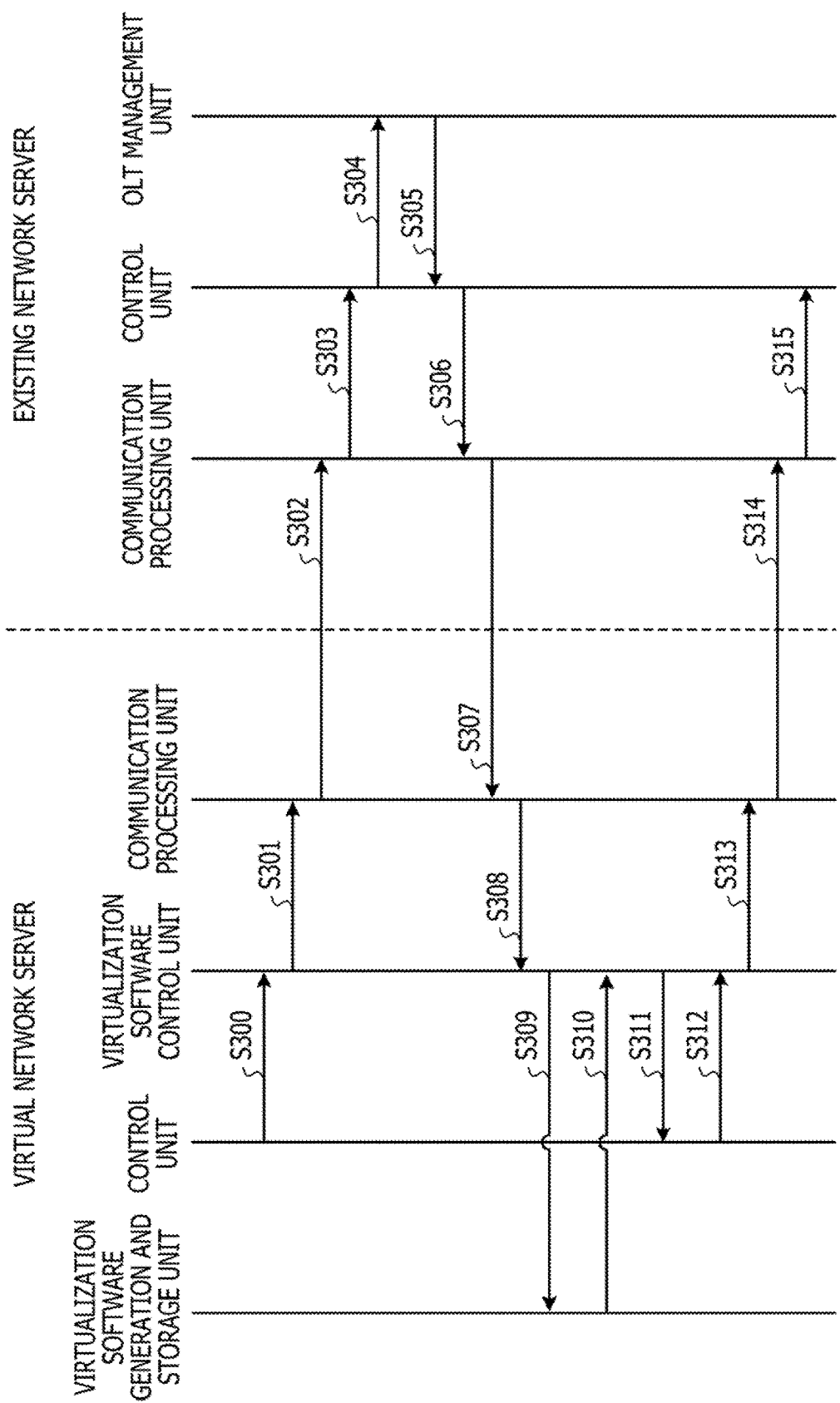
FIG. 7 is a diagram illustrating an example of the processing sequence for generating virtualization software and setting information.

FIG. 7 is a diagram illustrating an example of the processing sequence for generating virtualization software and setting information, which has been briefly described in step S101 in FIG. 2. First, the control unit 76 of the virtual network server 7 instructs the virtualization software control unit 75 to read the hardware function information held by the existing network server 5 (step S300). By receiving this, the virtualization software control unit 75 instructs the communication processing unit 72 to obtain the hardware function information (step S301). The communication processing unit 72 transmits a request (also described as a hardware function information request) of the hardware function information to the existing network server 5 via the virtual network interface unit 73 (step S302).

The communication processing unit 51 that has received the hardware function information request from the virtual network server 7 via the existing network interface unit 52 outputs the hardware function information request to the control unit 54 or requests the control unit 54 to obtain the hardware function information from the OLT management unit 55 (step S303). By receiving this, the control unit 54 requests the hardware function information from the OLT management unit 55 (step S304). The OLT management unit 55 outputs the hardware function information to the control unit 54 based on the request (step S305). The control unit 54 outputs the obtained hardware function information to the communication processing unit 51 (step S306). The communication processing unit 51 transmits the hardware function information to the virtual network server 7 via the existing network interface 52 (step S307).

The communication processing unit 72 that has received the hardware function information from the existing network server 5 via the virtual network interface unit 73 outputs the hardware function information to the virtualization software control unit 75 (step S308). The virtualization software control unit 75 outputs the hardware function information to the virtualization software generation and storage unit 70 and instructs the virtualization software generation and storage unit 70 to generate virtualization software based on the hardware function information (step S309). The virtualization software generation and storage unit 70 generates virtualization software based on the instruction from the virtualization software control unit 75 and notifies the virtualization software control unit 75 of the completion of the processing (step S310). The virtualization software control unit 75 notifies the control unit 76 of the completion of the generation processing of the virtualization software (step S311). By receiving the notification, the control unit 76 notifies the virtualization software control unit 75 of a response (step S312). The virtualization software control unit 75 instructs the communication processing unit 72 to notify the existing network server 5 of the completion of the generation of the virtualization software (step S313). The communication processing unit 72 transmits a notification of the generation completion of the virtualization software to the existing network server 5 in accordance with the instruction (step S314). The communication processing unit 51 in the existing network server 5 outputs to the control unit 54 the notification concerning the generation completion of the virtualization software that has been received via the existing network interface unit 52 (step S315). Also, although not illustrated in the figure, the existing network server 5 transmits a response to the notification concerning the generation completion of the virtualization software to the virtual network server 7.

Next, the virtual network server 7 obtains the setting parameter information from the existing network server 5. The sequence for obtaining the setting parameter information is substantially the same as the sequence for obtaining the hardware function information. However, in step S309, the virtualization software control unit 75 outputs the setting parameter information to the virtualization software generation and storage unit 70, and instructs the virtualization software generation and storage unit 70 to generate setting information including setting parameter values in the virtualization software. By receiving this, the virtualization software generation and storage unit 70 generates setting information. Also, after the notification in S311 is completed, at any timing until the switching time, the following processing is performed for starting operation of the virtual network OLT 8.

Figure 8:
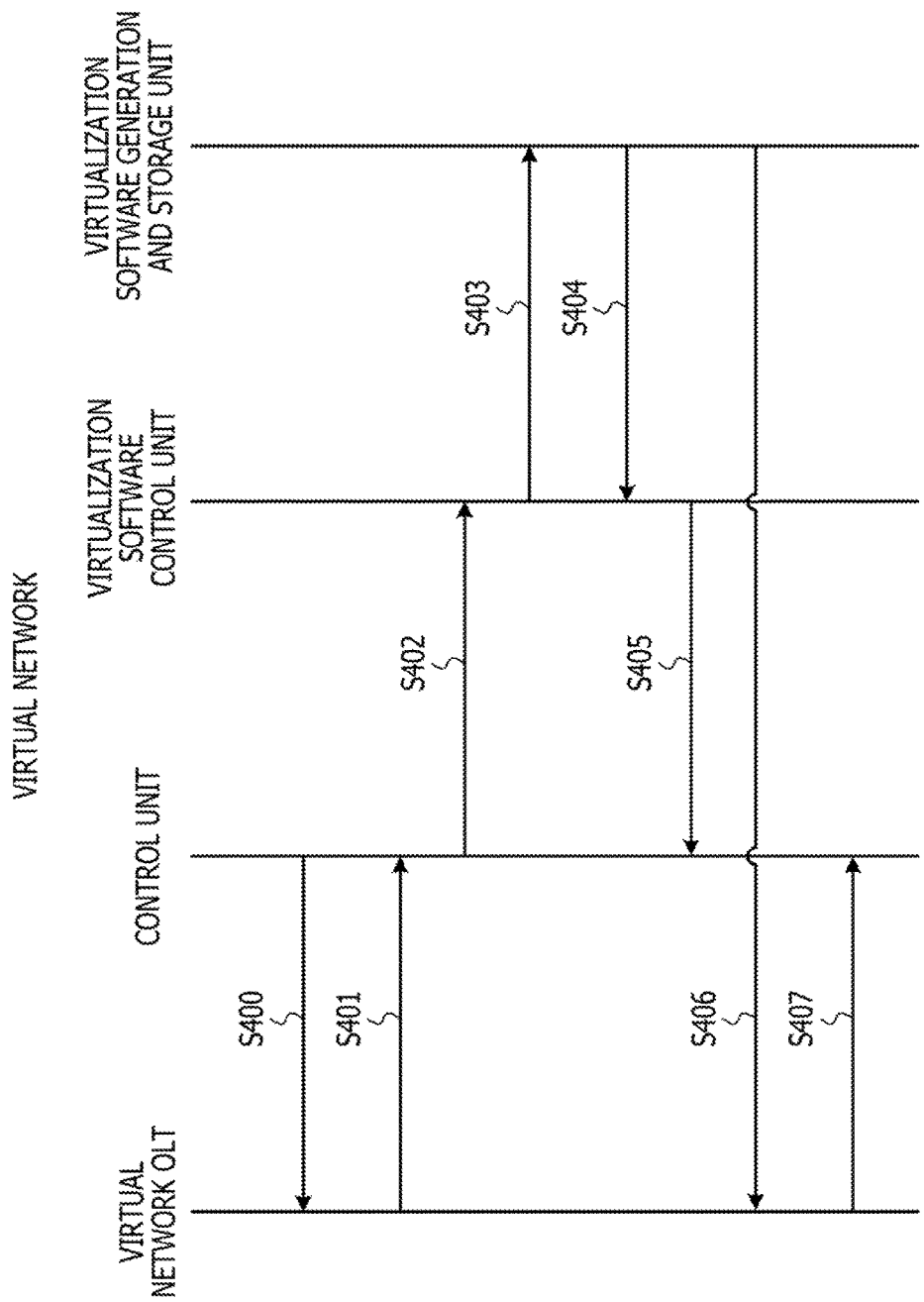
FIG. 8 is a diagram illustrating an example of the processing sequence for operation start of a virtual network OLT.

FIG. 8 is a diagram illustrating an example of the processing sequence for operation start of the virtual network OLT 8. In this regard, the control unit, the virtualization software control unit, the virtualization software generation and storage unit illustrated in FIG. 8 correspond to the control unit 76, the virtualization software control unit 75, the virtualization software generation and storage unit 70 in the virtual network server 7, respectively.

The control unit 76 gives a setting instruction to the virtual network OLT 8 via the communication processing unit 72 and the virtual network OLT interface unit 74 (step S400). The virtual network OLT 8 that has received this makes a response to the virtual network server 7 (step S401). The response is notified to the control unit 76 via the virtual network OLT interface unit 74 and the communication processing unit 72. The control unit 76 instructs the virtualization software control unit 75 to transmit the setting information to the virtual network OLT 8 (step S402). By receiving this, the virtualization software control unit 75 instructs the virtualization software generation and storage unit 70 to transmit the setting information to the virtual network OLT 8 (step S403). The virtualization software generation and storage unit 70 outputs a response to the instruction to the virtualization software control unit 75 (step S404). Also, the virtualization software control unit 75 that has received the response outputs a response to the instruction received in step S402 to the control unit 76 (step S405). The virtualization software generation and storage unit 70 transmits the setting information to the virtual network OLT 8 via the communication processing unit 72 and the virtual network OLT interface unit 74 (step S406). In this regard, the processing in step S406 may be performed prior to the processing in step S404 or in parallel with the processing. The virtual network OLT 8 that has obtained the setting information for communicating with the ONU 9 under the control thereof and that has completed the setup based on the setting information transmits the notification of the completion of the setup to the virtual network server 7 (step S407). The control unit 76 obtains the notification via the virtual network OLT interface unit 74 and the communication processing unit 72.

Figure 9:
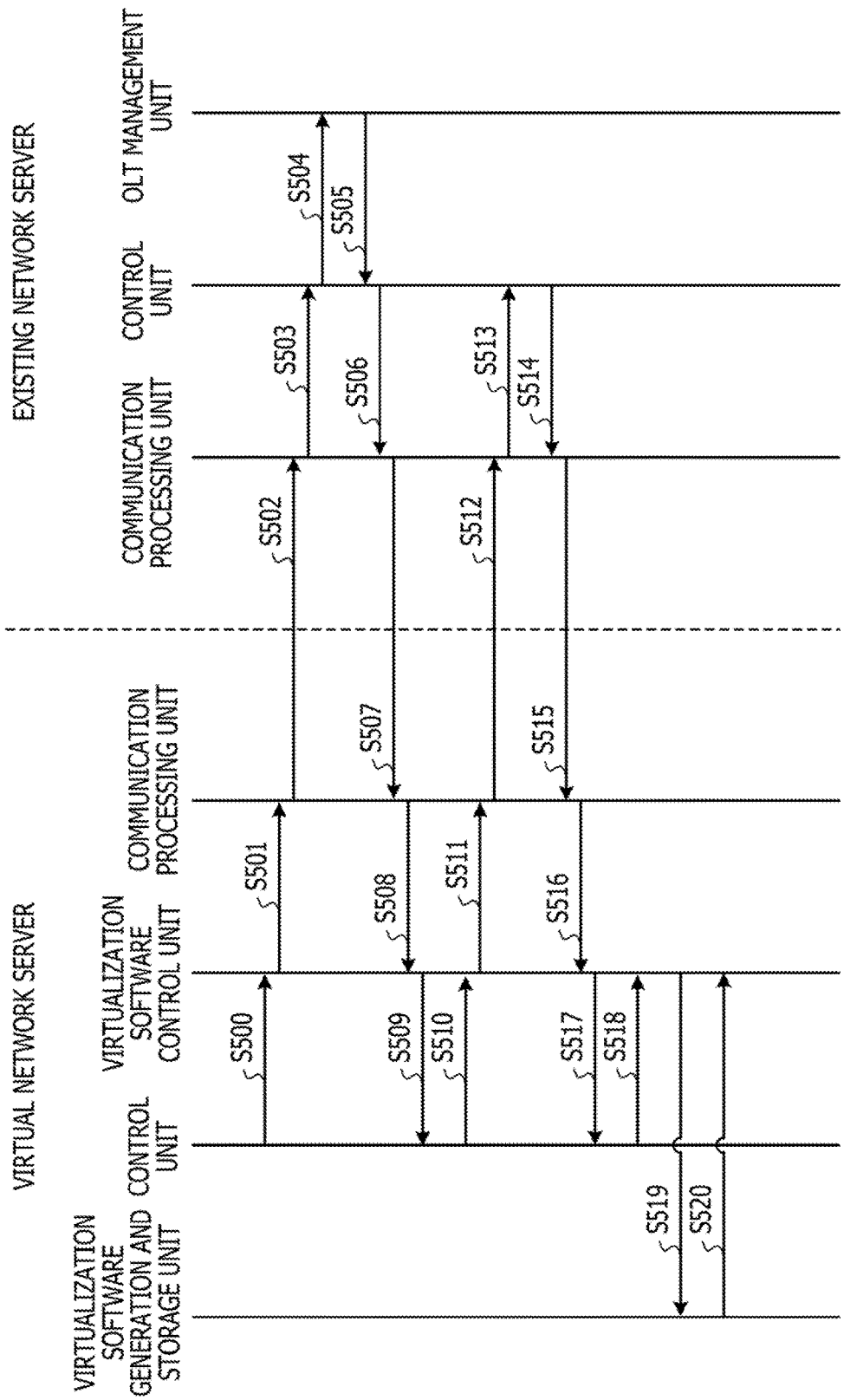
FIG. 9 is a diagram illustrating an example of the processing sequence for switching from communication processing in an existing network to communication processing in a virtual network.

Next, a description will be given of the processing for switching communication processing in the existing network 3 to processing in the virtual network 4. The processing corresponds to step S102 in FIG. 2. FIG. 9 is a diagram illustrating an example of the processing sequence for switching from communication processing in the existing network 3 to communication processing in the virtual network 4.

The control unit 76 of the virtual network server 7 instructs the virtualization software control unit 75 to obtain information concerning the communication state in order to switch from communication processing in the existing network 3 to communication processing in the virtual network 4 (step S500). The virtualization software control unit 75 instructs the communication processing unit 72 to obtain the information concerning the communication state (step S501). The communication processing unit 72 transmits a request of the information concerning the communication state to the existing network server 5 via the virtual network interface unit 73 (step S502). The communication processing unit 51 of the existing network server 5 that has obtained the request of the information concerning the communication state via the existing network interface unit 52 outputs that the request has been obtained or the request to the control unit 54 (step S503). The control unit 54 instructs the OLT management unit 55 to output the information concerning the communication state (step S504). By receiving the instruction, the OLT management unit 55 outputs the information concerning the communication state to the control unit 54 (step S505).

The communication state indicates the state of the communication among each existing network OLT 6 and the ONU 9. Also, the communication state may indicate the state of the communication among each port of each existing network OLT 6 and the ONU 9. In either case, the communication state includes, for example, communication start time and communication end time.

The control unit 54 outputs the information concerning the communication state obtained from the OLT management unit 55 to the communication processing unit 51 (step S506). The communication processing unit 51 transmits the information concerning the communication state to the virtual network server 7 via the existing network interface unit 52 (step S507). The communication processing unit 72 that has received the information concerning the communication state from the existing network server 5 via the virtual network interface unit 73 outputs this to the virtualization software control unit 75 (step S508). The virtualization software control unit 75 outputs the information concerning the communication state obtained from the communication processing unit 72 to the control unit 76 (step S509).

The control unit 76 determines an existing network OLT 6, a port, or an ONU 9 that becomes a switching target to the communication processing in the virtual network 4 based on the obtained information concerning the communication state and determines the switching time of the switching target. The switching time is selected from the time slots during which the switching target is not performing communication after the switching target is determined. Alternatively, the switching time may be determined in advance, and an existing network OLT 6, a port, or an ONU 9 that is not used in the communication processing at the determined switching time may be determined as a switching target. The control unit 76 notifies the virtualization software control unit 75 of the determined switching target and switching time (step S510).

The virtualization software control unit 75 notifies the communication processing unit 72 of the switching target and the switching time obtained from the control unit 76 (step S511). The communication processing unit 72 transmits the information concerning the switching target and the switching time obtained from the virtualization software control unit 75 to the existing network server 5 via the virtual network interface unit 73 (step S512). The communication processing unit 51 of the existing network server 5 that has received the information concerning the switching target and the switching time from the virtual network server 7 via the existing network interface unit 52 outputs the information to the control unit 54 (step S513). The control unit 54 makes a response to the output to the communication processing unit 51 (step S514). By receiving the response, the communication processing unit 51 transmits a response to the transmission of the data, such as the switching time, and the like from the virtual network server 7 in step S512 to the virtual network server 7 via the existing network interface unit 52 (step S515). The communication processing unit 72 that has obtained the response via the virtual network interface unit 73 notifies the virtualization software control unit 75 of the response (step S516). The virtualization software control unit 75 that has received the notification further notifies the control unit 76 of the response (step S517).

The control unit 76 outputs permission to switch from the communication processing in the existing network 3 to the communication processing in the virtual network 4 to the virtualization software control unit 75 based on the switching target and the information concerning the switching target (step S518). The virtualization software control unit 75 instructs the virtualization software generation and storage unit 70 to start the communication processing in the virtual network 4 at the switching time based on the information concerning the switching target (step S519). The virtualization software generation and storage unit 70 starts controlling the virtual network OLT under the control of the virtual network server 7 in which the virtualization software generation and storage unit 70 itself is included based on the information concerning the switching target and the operation of the communication processing. Also, the virtual network OLT 8 corresponding to the existing network OLT 6 of the switching target, the existing network OLT 6 including a port of the switching target, or the existing network OLT 6 coupled to the ONU 9 of the switching target performs communication processing with the ONU 9 based on setting information, and the like. The virtualization software generation and storage unit 70 notifies the virtualization software control unit 75 that the communication in the virtual network 4 has been started (step S520). Also, in the existing network server 5, the communication processing is stopped for the switching target at the switching time.

In this manner, before communication is switched from the communication in the existing network 3 to the communication in the virtual network 4, the virtual network server 7 generates the software for realizing the hardware function of the existing network 3 and sets the demanded parameters. Also, the virtual network server 7 accesses the existing network server 5 so as to detect a non-communication time slot during which communication is not performed between the existing network OLT 6 and the ONU 9, and determines switching time in the non-communication time slot. The existing network server 5 and the virtual network server 7 carries out switching of operation from the existing network 3 to the virtual network 4 at the determined switching time. Accordingly, the operation switching from the existing network 3 to the virtual network 4 is realized without interruption of data communication.

Figure 10:
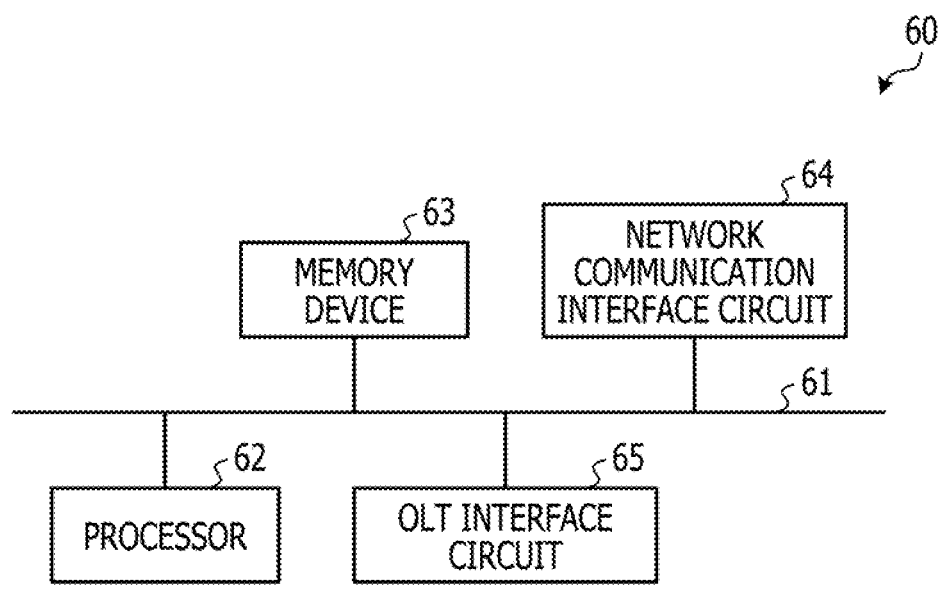
FIG. 10 is a diagram illustrating an example of each hardware configuration of the virtual network server and the existing network server according to the present embodiment.

FIG. 10 is a diagram illustrating an example of hardware configuration of each of the virtual network server 7 and the existing network server 5 according to the present embodiment. Here, the virtual network server 7 and the existing network server 5 each have hardware as a general computer, and each processing by the device is performed specifically using a hardware 60 described below. The hardware 60 includes a processor 62, a storage device 63, a network communication interface circuit 64, an OLT interface circuit 65, and the like that are mutually coupled by a bus 61.

The processor 62 is, for example, a single-core, dual-core, or multi-core processor. The storage device 63 is a memory, for example, a Read Only Memory (ROM), a Random Access Memory (RAM), a semiconductor memory, or the like. Also, the storage device 63 may include, for example, a hard disk drive, an optical disc device, or the like.

In this regard, in the virtual network server 7, the processor 62 executes a program stored in the storage device 63 so as to make it possible to provide the functions of the virtualization software generation and storage unit 70, the control plane unit 71, and the communication processing unit 72. Also, in the existing network server 5, the processor 62 executes a program stored in the storage device 63 so as to make it possible to provide the functions of the control plane unit 50 and the communication processing unit 51.

With the network communication interface circuit 64, a device, such as a computer, or the like exchanges information with a network, such as the Internet, an intranet, or the like. The network communication interface circuit 64 realizes each function of the existing network interface unit 52 and the virtual network interface unit 73.

The OLT interface circuit 65 exchanges information with the OLT to which a device, such as a computer, or the like is coupled. The OLT interface circuit 65 realizes each function of the existing network OLT interface unit 53 and the virtual network OLT interface unit 74.

In this regard, in addition to the cases described above, all of or a part of the functions of the functional blocks illustrated in FIG. 3 or FIG. 4 may be suitably realized by dedicated hardware.

By the communication control method according to the present embodiment, it becomes possible to dynamically switch from the communication processing in the existing network 3 to the communication processing in the virtual network 4 without interrupting the existing communication service.

Also, by executing the above-described steps S100 and step S101, it becomes possible for the virtual network 4 to perform communication processing performed in the existing network 3. Accordingly, when a failure, or the like occurs in the existing network 3, it is possible to utilize the virtual network 4 as a redundant path. That is, if a failure is detected in the existing network 3, the virtual network server 7 may perform switching from the communication processing in the existing network 3 to the communication processing in the virtual network 4. In this case, the virtual network server 7 holds the setting information in advance and starts communication in the virtual network 4 upon receipt of an input stating that the existing network 3 is unavailable from the higher level network 2, an input device not illustrated in the figure, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
    a memory; and
    a processor coupled to the memory and configured to:
        obtain function information indicating a hardware function of a first station-side device on a physical network and communication state information indicating a communication state of the first station-side device;
        based on the function information, generate setting information for switching a first communication between the first station-side device and a terminal device to a second communication between a second station-side device on a virtual network and the terminal device;
        specify, based on the communication state information, a time period in which the first communication is not executed;
        specify switching time which is in the identified time period and at which the first communication is to be switched to the second communication; and
        cause, based on the setting information and the specified switching time, the second station-side device to start the second communication.

2. The information processing apparatus according to claim 1, wherein
    the processor is configured to notify a control device configured to manage the physical network of the switching time.

3. The information processing apparatus according to claim 2, wherein
the physical network and the terminal device are coupled by an FTTx method, the virtual network and the terminal device are coupled by the FTTx method, the first station-side device and the second station-side device are Optical Line Terminals (OLTs), and the terminal device is an Optical Network Unit (ONU).

4. The information processing apparatus according to claim 3, wherein
the processor is configured to perform a switching from the first communication to the second communication for an OLT, for a port of the OLT, or for an ONU coupled to the port of the OLT.

5. The information processing apparatus according to claim 3, wherein
the function information indicates a hardware function of the first station-side device managed by the control device.

6. The information processing apparatus according to claim 3, wherein
the processor is configured to, when a failure in the physical network is detected, cause the second station-side device to perform the second communication with the terminal device.

7. A method comprising:
obtaining function information indicating a hardware function of a first station-side device on a physical network and communication state information indicating a communication state of the first station-side device;
based on the function information, generating setting information for switching a first communication between the first station-side device and a terminal device to a second communication between a second station-side device on a virtual network and the terminal device;
specifying, based on the communication state information, a time period in which the first communication is not executed;
specifying switching time which is in the identified time period and at which the first communication is to be switched to the second communication; and
causing, based on the setting information and the specified switching time, the second station-side device to start the second communication.

8. The method according to claim 7, further comprising:
notifying a control device configured to manage the physical network of the switching time.

9. The method according to claim 8, wherein
the physical network and the terminal device are coupled by an FTTx method, the virtual network and the terminal device are coupled by the FTTx method, the first station-side device and the second station-side device are Optical Line Terminals (OLTs), and the terminal device is an Optical Network Unit (ONU).

10. The method according to claim 9, wherein
a switching from the first communication to the second communication is performed for an OLT, for a port of the OLT, or for an ONU coupled to the port of the OLT.

11. The method according to claim 9, wherein
the function information indicates a hardware function of the first station-side device managed by the control device.

12. The method according to claim 9, wherein
when a failure in the physical network is detected, the second station-side device performs the second communication with the terminal device.

13. A non-transitory computer-readable storage medium storing a program that causes an information processing apparatus to execute a process, the process comprising:
obtaining function information indicating a hardware function of a first station-side device on a physical network and communication state information indicating a communication state of the first station-side device;
based on the function information, generating setting information for switching a first communication between the first station-side device and a terminal device to a second communication between a second station-side device on a virtual network and the terminal device;
specifying, based on the communication state information, a time period in which the first communication is not executed;
specifying switching time which is in the identified time period and at which the first communication is to be switched to the second communication; and
causing, based on the setting information and the specified switching time, the second station-side device to start the second communication.

14. The non-transitory computer-readable storage medium according to claim 13, the process further comprising:
notifying a control device configured to manage the physical network of the switching time.

15. The non-transitory computer-readable storage medium according to claim 14, wherein
the physical network and the terminal device are coupled by an FTTx method, the virtual network and the terminal device are coupled by the FTTx method, the first station-side device and the second station-side device are Optical Line Terminals (OLTs), and the terminal device is an Optical Network Unit (ONU).

16. The non-transitory computer-readable storage medium according to claim 15, wherein
a switching from the first communication to the second communication is performed for an OLT, for a port of the OLT, or for an ONU coupled to the port of the OLT.

17. The non-transitory computer-readable storage medium according to claim 15, wherein
the function information indicates a hardware function of the first station-side device managed by the control device.

18. The non-transitory computer-readable storage medium according to claim 15, wherein
when a failure in the physical network is detected, the second station-side device performs the second communication with the terminal device.

* * * * *